(12) United States Patent
Kajiya et al.

(10) Patent No.: US 11,693,157 B2
(45) Date of Patent: Jul. 4, 2023

(54) FINE CONCAVE-CONVEX LAMINATE AND PRODUCTION METHOD THEREFOR, AND CAMERA MODULE-MOUNTED DEVICE

(71) Applicant: Dexerials Corporation, Shinagawa-ku Tokyo (JP)

(72) Inventors: Shunichi Kajiya, Tagajo (JP); Kazuya Hayashibe, Tagajo (JP); Naoki Hanashima, Tagajo (JP); Hiroshi Sugata, Tagajo (JP)

(73) Assignee: Dexerials Corporation, Shinagawa-ku Tokyo (JP)

( * ) Notice: Subject to any disclaimer, the term of this patent is extended or adjusted under 35 U.S.C. 154(b) by 0 days.

(21) Appl. No.: 16/625,255

(22) PCT Filed: Jun. 29, 2018

(86) PCT No.: PCT/JP2018/024813
§ 371 (c)(1),
(2) Date: Dec. 20, 2019

(87) PCT Pub. No.: WO2019/009199
PCT Pub. Date: Jan. 10, 2019

(65) Prior Publication Data
US 2020/0217992 A1    Jul. 9, 2020

(30) Foreign Application Priority Data
Jul. 3, 2017   (JP) ................................. 2017-130556

(51) Int. Cl.
*G02B 1/118*    (2015.01)
*B32B 7/023*    (2019.01)
(Continued)

(52) U.S. Cl.
CPC .............. *G02B 1/118* (2013.01); *B29C 59/02* (2013.01); *B32B 3/30* (2013.01); *B32B 7/023* (2019.01);
(Continued)

(58) Field of Classification Search
CPC ........... G02B 1/118; B32B 3/30; B32B 7/023; B32B 27/08; B32B 2305/72;
(Continued)

(56) References Cited

U.S. PATENT DOCUMENTS

2001/0021446 A1*  9/2001  Takematsu ............. G02B 1/113
                                                          428/220
2013/0004711 A1*  1/2013  Doi ........................ G02B 1/118
                                                          428/141
(Continued)

FOREIGN PATENT DOCUMENTS

CN    104755259 A    7/2015
JP    2003294904 A   10/2003
(Continued)

OTHER PUBLICATIONS

Translation to English of JP2016-210150 A via espacenet. accessed Aug. 9, 2022 (Year: 2016).*
(Continued)

*Primary Examiner* — Nancy R Johnson
(74) *Attorney, Agent, or Firm* — Kenja IP Law PC

(57) ABSTRACT

Provided is a fine concave-convex laminate that is reduced in thickness, has excellent antireflection performance, and can suppress scattering and absorption of short-wavelength light. A fine concave-convex laminate comprises a substrate, a first transparent organic layer, and a second transparent organic layer laminated in the stated order, wherein the first transparent organic layer has a fine concave-convex structure at a surface facing the second transparent organic layer,
(Continued)

the second transparent organic layer has fine concave-convex structures at both surfaces, and a thickness of a composite layer composed of the first transparent organic layer and the second transparent organic layer is 15 μm or less.

9 Claims, 11 Drawing Sheets

(51) Int. Cl.
    *B29C 59/02*     (2006.01)
    *B32B 27/08*     (2006.01)
    *B32B 3/30*     (2006.01)

(52) U.S. Cl.
    CPC .......... *B32B 27/08* (2013.01); *B32B 2305/72* (2013.01); *B32B 2307/418* (2013.01); *B32B 2309/105* (2013.01); *Y10T 428/24355* (2015.01); *Y10T 428/24364* (2015.01)

(58) Field of Classification Search
    CPC ........ B32B 2307/418; B32B 2309/105; B32B 38/06; B29C 59/00; H04N 5/225; Y10T 428/24355; Y10T 428/24364
    See application file for complete search history.

(56) References Cited

U.S. PATENT DOCUMENTS

| | | | | |
|---|---|---|---|---|
| 2015/0231854 | A1* | 8/2015 | Nakai | G02B 1/115 428/172 |
| 2016/0370505 | A1* | 12/2016 | Koo | H01L 27/14685 |
| 2017/0348943 | A1* | 12/2017 | Kajiya | G03F 7/0002 |

FOREIGN PATENT DOCUMENTS

| | | | | |
|---|---|---|---|---|
| JP | 2007009133 | A | | 1/2007 |
| JP | 2007025201 | A | | 2/2007 |
| JP | 2012192737 | A | | 10/2012 |
| JP | 2015054402 | A | | 3/2015 |
| JP | 2016081210 | A | | 5/2016 |
| JP | 2016122163 | A | | 7/2016 |
| JP | 2016210150 | A | * | 12/2016 |
| JP | 2016210150 | A | | 12/2016 |
| WO | 2014065136 | A1 | | 5/2014 |
| WO | WO-2016103980 | A1 | * | 6/2016 ....... B29D 11/00288 |
| WO | 2017104831 | A1 | | 6/2017 |
| WO | 2017104834 | A1 | | 6/2017 |

OTHER PUBLICATIONS

Jan. 9, 2020, International Preliminary Report on Patentability issued in the International Patent Application No. PCT/JP2018/024813.

Sep. 11, 2018, International Search Report issued in the International Patent Application No. PCT/JP2018/024813.

Oct. 5, 2021, Office Action issued by the Taiwan Intellectual Property Office in the corresponding Taiwanese Patent Application No. 107122858.

Jul. 13, 2021, Office Action issued by the China National Intellectual Property Administration in the corresponding Chinese Patent Application No. 201880043296.1.

Jul. 26, 2022, Notification of Reasons for Refusal issued by the Japan Patent Office in the corresponding Japanese Patent Application No. 2018-125240.

Mar. 14, 2023, Official Decision of Refusal issued by the Japan Patent Office in the corresponding Japanese Patent Application No. 2018-125240.

* cited by examiner

EXAMPLE4

EXAMPLE5

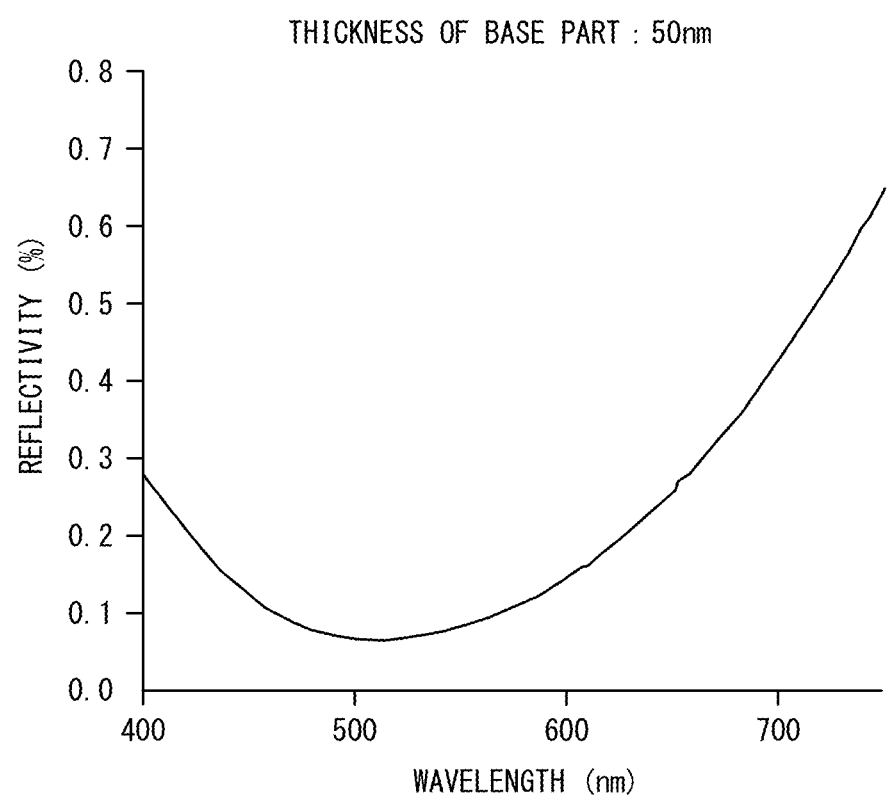

FINE CONCAVE-CONVEX LAMINATE AND PRODUCTION METHOD THEREFOR, AND CAMERA MODULE-MOUNTED DEVICE

TECHNICAL FIELD

The present disclosure relates to a fine concave-convex laminate and a production method therefor, and a camera module-mounted device.

BACKGROUND

In display devices such as liquid crystal displays and optical devices such as cameras, a light incidence surface of a substrate such as a display plate or a lens tends to be subjected to antireflection treatment in order to prevent degradation in visibility and image quality (occurrence of color unevenness, ghosts, etc.) caused by reflection of external light. A conventionally known antireflection treatment method forms a fine concave-convex structure at the light incidence surface to reduce reflectivity.

For example, PTL 1 discloses the following technique of antireflection treatment: A laminate structure includes a substrate, an intermediate layer, and an outermost layer, and has a fine concave-convex structure at the surface of the outermost layer and has optimized indentation elastic modulus of the substrate surface and optimized indentation elastic modulus of the outermost layer-side surface. Such a laminate structure is useful as an antireflection film or the like, and is attachable to a surface of a display device or the like.

CITATION LIST

Patent Literature

PTL 1: JP 2015-054402 A

SUMMARY

Technical Problem

For use in electronics, articles such as antireflection films are required to be thinner (e.g. 15 µm or less).

To properly form the structure in PTL 1, however, the total film thickness of the outermost layer and the intermediate layer needs to be 25 µm or more. The structure in PTL 1 thus has room for improvement in thickness reduction.

Moreover, particularly in the case where a cover film mounted on the front of a sensor or a cover film mounted on the front of a camera module sensor scatters or absorbs light, especially short-wavelength light, light does not enter sufficiently, which hinders good operation of the sensor. Accordingly, articles such as the foregoing film are required to not only have antireflection function but also reduce scattering and absorption of light, especially short-wavelength light.

It could therefore be helpful to provide a fine concave-convex laminate that is reduced in thickness, has excellent antireflection performance, and can suppress scattering and absorption of short-wavelength light, and a production method therefor. It could also be helpful to provide a camera module-mounted device capable of obtaining a captured image without color unevenness, ghosts, and the like.

Solution to Problem

We thus provide:

<1> A fine concave-convex laminate comprising a substrate, a first transparent organic layer, and a second transparent organic layer laminated in the stated order, wherein the first transparent organic layer has a fine concave-convex structure at a surface facing the second transparent organic layer, the second transparent organic layer has fine concave-convex structures at both surfaces, and a thickness of a composite layer composed of the first transparent organic layer and the second transparent organic layer is 15 µm or less.

<2> The fine concave-convex laminate according to <1>, wherein the fine concave-convex structures at both surfaces of the second transparent organic layer each have a concave-convex pattern having a pitch of less than or equal to visible light wavelength.

<3> The fine concave-convex laminate according to <1> or <2>, wherein a thickness of a part of the second transparent organic layer without any fine concave-convex structure is 250 nm or less.

<4> The fine concave-convex laminate according to any of <1> to <3>, wherein the first transparent organic layer and the second transparent organic layer are laminated only on part of a surface of the substrate.

<5> The fine concave-convex laminate according to any of <1> to <4>, wherein the following Formulas (1) and (2):

$$n_0 < n_2 \quad (1)$$

$$2n_0 - n_2 \le n_1 \le 2n_2 - n_0 \quad (2)$$

are satisfied, where $n_0$ is a refractive index of the substrate in a visible light wavelength range, $n_1$ is a refractive index of the first transparent organic layer in the visible light wavelength range, and $n_2$ is a refractive index of the second transparent organic layer in the visible light wavelength range.

<6> The fine concave-convex laminate according to <5>, wherein the following Formula (3):

$$2n_0 - n_2 < n_1 < n_2 \quad (3)$$

is further satisfied.

<7> The fine concave-convex laminate according to any of <1> to <4>, wherein the following Formulas (4), (5), and (6):

$$-0.002 \le n_0 - n_2 \le 0.002 \quad (4)$$

$$n_1 < n_0 \quad (5)$$

$$n_1 < n_2 \quad (6)$$

are satisfied, where $n_0$ is a refractive index of the substrate in a visible light wavelength range, $n_1$ is a refractive index of the first transparent organic layer in the visible light wavelength range, and $n_2$ is a refractive index of the second transparent organic layer in the visible light wavelength range.

<8> The fine concave-convex laminate according to any of <1> to <7>, wherein an average value of difference absolute values is 0.020% or less, the average value of difference absolute values being obtained by calculating, in a reflection spectrum of light from a side on which the second transparent organic layer is located, a wavelength moving average value per 1 nm using values of reflectivity of preceding and succeeding 25 nm in a wavelength range of 400 nm to 750 nm, calculating a difference absolute value between the wavelength moving average value and a value of the reflection spectrum, and averaging calculated difference absolute values.

<9> The fine concave-convex laminate according to any of <1> to <8>, wherein a refractive index $n_1$ of the first transparent organic layer at a wavelength of 550 nm is 1.480 or more and 1.580 or less.

<10> The fine concave-convex laminate according to any of <1> to <9>, used in a camera module-mounted device.

<11> A production method for the fine concave-convex laminate according to any of <1> to <10>, the production method comprising: sandwiching a UV curable resin A between two holding films each having a fine concave-convex structure at a surface thereof, and pressure joining the UV curable resin A and the two holding films; curing the sandwiched UV curable resin A by irradiation with UV light, to form the second transparent organic layer having the fine concave-convex structures at both surfaces; peeling one holding film from the second transparent organic layer; laminating the second transparent organic layer from which the one holding film has been peeled on a substrate in a state in which a surface from which the one holding film has been peeled is in contact with the substrate with a UV curable resin B therebetween, and pressing the second transparent organic layer from a side on which the other holding film is located; curing the UV curable resin B by irradiation with UV light while pressing the second transparent organic layer, to form the first transparent organic layer having the fine concave-convex structure at the surface facing the second transparent organic layer; and releasing press of the second transparent organic layer and peeling a part of the second transparent organic layer fixed to the substrate by the first transparent organic layer from the other holding film while separating the part fixed by the first transparent organic layer from a part of the second transparent organic layer other than the part fixed by the first transparent organic layer.

<12> A camera module-mounted device comprising a camera module and a display plate, wherein the display plate includes a first transparent organic layer laminated on at least part of a surface thereof, and a second transparent organic layer laminated on the first transparent organic layer, the first transparent organic layer has a fine concave-convex structure at a surface facing the second transparent organic layer, the second transparent organic layer has fine concave-convex structures at both surfaces, a thickness of a composite layer composed of the first transparent organic layer and the second transparent organic layer is 15 µm or less, and the camera module is set facing the second transparent organic layer.

Advantageous Effect

It is thus possible to provide a fine concave-convex laminate that is reduced in thickness, has excellent antireflection performance, and can suppress scattering and absorption of short-wavelength light, and a production method therefor. It is also possible to provide a camera module-mounted device capable of obtaining a captured image without color unevenness, ghosts, and the like.

BRIEF DESCRIPTION OF THE DRAWINGS

In the accompanying drawings:

FIG. 14E is a schematic diagram illustrating a light reflection spectrum of a fine concave-convex laminate according to one of the disclosed embodiments.

DETAILED DESCRIPTION

One of the disclosed embodiments will be described in detail below.

(Fine Concave-Convex Laminate)

A fine concave-convex laminate according to the present disclosure comprises a substrate, a first transparent organic layer, and a second transparent organic layer laminated in the stated order, wherein the first transparent organic layer has a fine concave-convex structure at a surface facing the second transparent organic layer (i.e. a second transparent organic layer-side surface), the second transparent organic layer has fine concave-convex structures at both surfaces, and a total thickness of the first transparent organic layer and the second transparent organic layer is 15 μm or less.

A fine concave-convex laminate according to one of the disclosed embodiments (hereafter also referred to as a "fine concave-convex laminate according to this embodiment") will be described below, with reference to FIG. 1, etc.

Figure 1:
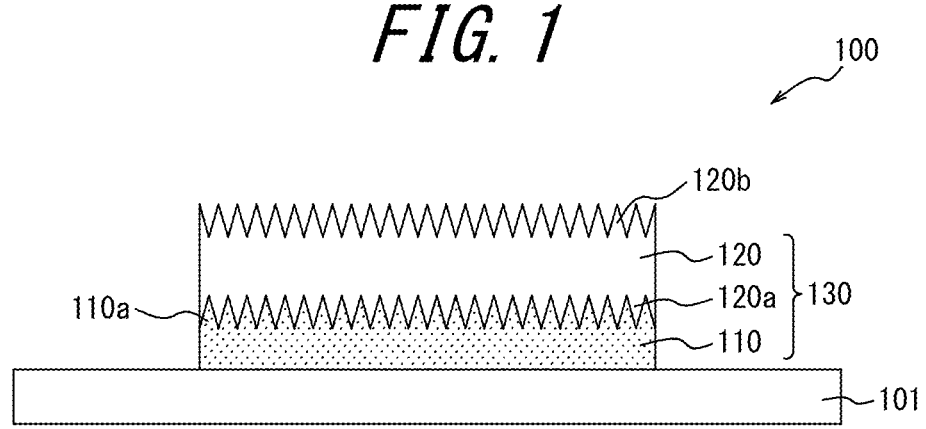
FIG. 1 is a schematic sectional diagram illustrating a fine concave-convex laminate according to one of the disclosed embodiments.

As illustrated in FIG. 1, a fine concave-convex laminate 100 according to this embodiment includes a substrate 101, and a layer composed of two transparent organic layers, namely, a composite layer 130 composed of a first transparent organic layer 110 and a second transparent organic layer 120 (hereafter simply referred to as a "composite layer 130"). The first transparent organic layer 110 is laminated on the substrate 101, and the second transparent organic layer 120 is laminated on the first transparent organic layer 110. The first transparent organic layer 110 has a fine concave-convex structure 110a at a second transparent organic layer 120-side surface. The second transparent organic layer 120 has a fine concave-convex structure 120a at a first transparent organic layer 110-side surface, and a fine concave-convex structure 120b at the opposite surface. The fine concave-convex laminate 100 according to this embodiment, as a result of having the foregoing structure, can exhibit high antireflection performance and suppress scattering and absorption of short-wavelength light.

In addition, in the fine concave-convex laminate 100 according to this embodiment, the thickness of the composite layer 130 is 15 μm or less, thus achieving thickness reduction. Although several structures formed by laminating layers having fine concave-convex structures have been developed conventionally, these structures fail to achieve a layer thickness of 15 μm or less. The fine concave-convex laminate 100 according to this embodiment, as a result of being produced using the below-described production method for a fine concave-convex laminate according to the present disclosure as an example, can have a thickness of the composite layer 130 of 15 μm or less while holding the fine concave-convex structures 110a, 120a, and 120b. In the fine concave-convex laminate 100 according to this embodiment, the thickness of the composite layer 130 composed of the first transparent organic layer 110 and the second transparent organic layer 120 is preferably 10 μm or less, and is preferably 0.6 μm or more, in terms of further thickness reduction. The thickness of the composite layer 130 herein is the distance in the lamination direction between the vertex of the highest convex portion of the fine concave-convex structure 120b of the second transparent organic layer 120 and the point of the first transparent organic layer 110 in contact with the substrate 101.

The term "transparent" herein denotes high transmittance of light whose wavelength belongs to the visible light band (approximately 360 nm to 830 nm). For example, the term "transparent" denotes that the transmittance of the light is 70% or more.

<Substrate>

The material of the substrate 101 used in this embodiment is not limited, and may be selected as appropriate depending on the purpose. Examples include glass, glass coated with any organic material, and polymethyl methacrylate (PMMA). The substrate 101 is preferably transparent. The surface on which the first transparent organic layer is laminated may be, for example, a flat surface. An example of the organic material is polyimide.

<First Transparent Organic Layer>

The first transparent organic layer 110 used in this embodiment has the fine concave-convex structure 110a at the second transparent organic layer 120-side surface (upper surface), as mentioned above. That is, a fine concave-convex pattern (convex portions projecting in the thickness direction of the fine concave-convex laminate and concave portions recessed in the thickness direction of the fine concave-convex laminate) is formed at the upper surface of the first transparent organic layer 110. This improves antireflection performance. The convex portions and the concave portions may be regularly arranged (e.g. in a hound's-tooth check pattern or a rectangular lattice pattern), or randomly arranged. The shape of each of the convex portions and the concave portions is not limited, and may be shell shape, cone shape, pillar shape, needle shape, or the like.

The shape of the concave portion denotes the shape defined by the inner wall of the concave portion.

The average cycle (pitch) of the concave-convex pattern of the upper surface of the first transparent organic layer 110 is preferably less than or equal to visible light wavelength (e.g. 830 nm or less), more preferably 350 nm or less, and further preferably 280 nm or less, and is more preferably 100 nm or more, and further preferably 150 nm or more. As a result of the pitch of the concave-convex pattern at the upper surface of the first transparent organic layer 110 being less than or equal to visible light wavelength, that is, as a result of the upper surface of the first transparent organic layer 110 having a moth-eye structure, antireflection performance can be further improved.

The average cycle of the concave-convex pattern is an arithmetic mean value of distances between adjacent convex portions and between adjacent concave portions. The concave-convex pattern can be observed, for example, using a scanning electron microscope (SEM) or a cross-sectional transmission electron microscope (cross-sectional TEM). As an example of the average cycle calculation method, a plurality of pairs of adjacent convex portions and a plurality of pairs of adjacent concave portions are selected, the distance between the convex portions forming each pair and the distance between the concave portions forming each pair are measured, and the measurement values are averaged.

The depth of the concave portion (the height of the convex portion) in the concave-convex pattern of the upper surface of the first transparent organic layer 110 is not limited, but is preferably 150 nm or more and more preferably 190 nm or more, and is preferably 300 nm or less and more preferably 230 nm or less.

Figure 2:
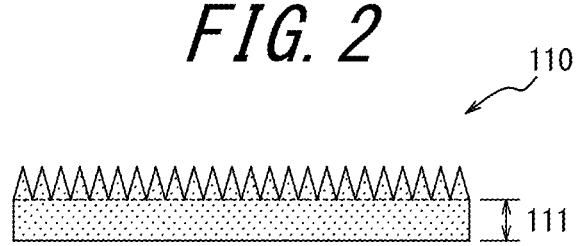
FIG. 2 is a schematic sectional diagram illustrating a first transparent organic layer of the fine concave-convex laminate according to one of the disclosed embodiments.

The thickness of the part of the first transparent organic layer 110 in which the concave-convex pattern is not formed, i.e. a base part 111 (see FIG. 2), is not limited, but is preferably 500 nm or more, and is preferably 9000 nm or less.

The first transparent organic layer 110 used in this embodiment may be produced, for example, from a UV curable resin. The UV curable resin is not limited, and examples include a UV curable acrylic resin and a UV curable epoxy resin.

<Second Transparent Organic Layer>

The second transparent organic layer 120 used in this embodiment has the fine concave-convex structure 120*a* at the first transparent organic layer 110-side surface (lower surface), and the fine concave-convex structure 120*b* at the opposite surface (upper surface), as mentioned above. That is, a fine concave-convex pattern (convex portions projecting in the thickness direction of the fine concave-convex laminate and concave portions recessed in the thickness direction of the fine concave-convex laminate) is formed at both surfaces of the second transparent organic layer 120. This improves antireflection performance. The convex portions and the concave portions may be regularly arranged (e.g. in a hound's-tooth check pattern or a rectangular lattice pattern), or randomly arranged. The shape of each of the convex portions and the concave portions is not limited, and may be shell shape, cone shape, pillar shape, needle shape, or the like.

The average cycle (pitch) of the concave-convex pattern of each of the lower and upper surfaces of the second transparent organic layer 120 is preferably less than or equal to visible light wavelength (e.g. 830 nm or less), more preferably 350 nm or less, and further preferably 280 nm or less, and is more preferably 100 nm or more, and further preferably 150 nm or more. As a result of the pitch of the concave-convex pattern at each of the lower and upper surfaces of the second transparent organic layer 120 being less than or equal to visible light wavelength, that is, as a result of each of the lower and upper surfaces of the second transparent organic layer 120 having a moth-eye structure, antireflection performance can be further improved.

The depth of the concave portion (the height of the convex portion) in the concave-convex pattern of the upper surface of the second transparent organic layer 120 is not limited, but is preferably 150 nm or more and more preferably 190 nm or more, and is preferably 300 nm or less and more preferably 230 nm or less.

Figure 3:
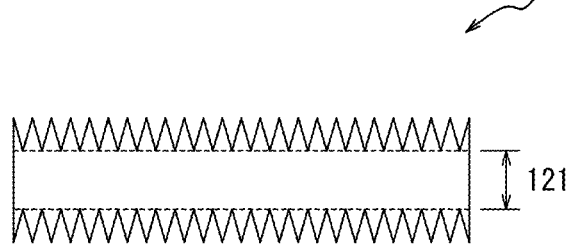
FIG. 3 is a schematic sectional diagram illustrating a second transparent organic layer of the fine concave-convex laminate according to one of the disclosed embodiments.

The thickness of the part of the second transparent organic layer 120 in which the concave-convex patterns are not formed (the part without any fine concave-convex structure), i.e. a base part 121 (see FIG. 3), is preferably 250 nm or less. If the thickness of the part of the second transparent organic layer without any fine concave-convex structure is 250 nm or less, oscillation (ripple) in a reflection spectrum caused by multireflection between layers is reduced, so that color unevenness and reflection deterioration can be further suppressed. From the same perspective, the thickness of the part of the second transparent organic layer without any fine concave-convex structure is more preferably 200 nm or less, further preferably 100 nm or less, and particularly preferably 50 nm or less. The thickness of the part of the second transparent organic layer without any fine concave-convex structure may be 0.01 nm or more, from a realistic standpoint. Herein, the thickness of the part of the second transparent organic layer without any fine concave-convex structure is the distance between the vertex of the deepest concave portion formed at one surface and the vertex of the deepest concave portion formed at the other surface in the lamination direction or the film thickness direction.

The fine concave-convex structure 120*a* at the lower surface of the second transparent organic layer 120 preferably corresponds to the fine concave-convex structure 110*a* at the upper surface of the first transparent organic layer 110, and more preferably meshes with the fine concave-convex structure 110*a* at the upper surface of the first transparent organic layer 110 without a gap, as illustrated in FIG. 1. This prevents separation of the first transparent organic layer 110 and the second transparent organic layer 120 from each other, and further ensures high optical performance such as antireflection performance.

The fine concave-convex structure 120*a* at the lower surface of the second transparent organic layer 120 and the fine concave-convex structure 120*b* at the upper surface of the second transparent organic layer 120 may be the same or different in the layout of the concave portions and the convex portions, the average cycle of the concave-convex pattern, the depth of the concave portion, etc.

The second transparent organic layer 120 used in this embodiment may be produced, for example, from a UV curable resin. The UV curable resin is not limited, and examples include a UV curable acrylic resin and a UV curable epoxy resin.

<Optical Properties, Etc. of Each Layer>

The fine concave-convex laminate 100 according to this embodiment preferably satisfies the following Formulas (1) and (2):

$$n_0 < n_2 \tag{1}$$

$$2n_0 - n_2 \le n_1 \le 2n_2 - n_0 \tag{2}$$

where $n_0$ is the refractive index of the substrate 101 in the visible light wavelength range, $n_1$ is the refractive index of the first transparent organic layer 110 in the visible light wavelength range, and $n_2$ is the refractive index of the second transparent organic layer 120 in the visible light wavelength range. As a result of the fine concave-convex laminate 100 satisfying both of Formulas (1) and (2), oscillation (ripple) in the reflection spectrum caused by multireflection between layers is reduced, so that color unevenness and reflection deterioration can be suppressed.

The fine concave-convex laminate according to this embodiment more preferably satisfies, in addition to Formulas (1) and (2), the following Formula (3):

$$2n_0 - n_2 < n_1 < n_2 \tag{3}$$

As a result of the fine concave-convex laminate 100 satisfying Formula (3) in addition to Formulas (1) and (2), oscillation (ripple) in the reflection spectrum caused by multireflection between layers is further reduced, so that color unevenness and reflection deterioration can be further suppressed.

On the other hand, the fine concave-convex laminate according to this embodiment also preferably satisfies the following Formulas (4), (5), and (6):

$$-0.002 \le n_0 - n_2 \le 0.002 \tag{4}$$

$$n_1 < n_0 \tag{5}$$

$$n_1 < n_2 \tag{6}$$

As a result of the fine concave-convex laminate 100 satisfying all of Formulas (4), (5), and (6), oscillation (ripple) in the reflection spectrum caused by multireflection between layers is further reduced, so that color unevenness and reflection deterioration can be further suppressed. From the same perspective, the fine concave-convex laminate 100 more preferably satisfies $n_0 = n_2$.

The visible light wavelength range is considered to be approximately 380 nm to 780 nm. Herein, to "satisfy" the foregoing formulas or to "conform to" the foregoing formulas means that the foregoing formulas hold for each wavelength in the visible light wavelength range.

In the fine concave-convex laminate 100 according to this embodiment, the refractive index $n_0$ of the substrate 101 at a wavelength of 550 nm is preferably 1.480 or more and 1.580 or less. As a result of $n_0$ being 1.480 or more, the optical properties can be adjusted. As a result of $n_0$ being 1.580 or less, the optical properties can be adjusted.

In the fine concave-convex laminate 100 according to this embodiment, the refractive index $n_1$ of the first transparent organic layer 110 at a wavelength of 550 nm is preferably 1.480 or more and 1.580 or less, and more preferably 1.490 or more and 1.530 or less. As a result of $n_1$ being 1.480 or more, the optical properties can be adjusted more easily and the fine concave-convex structure can be formed more easily, in the case where the material of the first transparent organic layer and/or the second transparent organic layer is an acrylic resin. As a result of $n_1$ being 1.580 or less, the optical properties can be adjusted more easily and the fine concave-convex structure can be formed more easily, in the case where the material of the first transparent organic layer and/or the second transparent organic layer is an acrylic resin.

The fine concave-convex laminate 100 according to this embodiment preferably has less oscillation (ripple) in the reflection spectrum. Specifically, in the fine concave-convex laminate 100 according to this embodiment, an average value of difference absolute values (hereafter also referred to as a "difference absolute average value") is preferably 0.020% or less. The difference absolute average value is obtained by calculating, in a reflection spectrum of light from the second transparent organic layer 120 side, a wavelength moving average value per 1 nm using values of reflectivity of preceding and succeeding 25 nm in a wavelength range of 400 nm to 750 nm, calculating a difference absolute value between the wavelength moving average value and a value of the spectrum, and averaging the calculated difference absolute values. As a result of the difference absolute average value being 0.020% or less, color unevenness and reflection deterioration are further suppressed.

The adjustment of the difference absolute average value is not limited. For example, the difference absolute average value may be adjusted by adjusting the refractive index $n_0$ of the substrate, the refractive index $n_1$ of the first transparent organic layer, and the refractive index $n_2$ of the second transparent organic layer. For example, through adjustment to satisfy all of the foregoing Formulas (1), (2), and (3), the difference absolute average value can be adjusted to 0.020% or less. The difference absolute average value may also be adjusted by adjusting the thickness of the part of the second transparent organic layer without any fine concave-convex structure.

<Uses of Fine Concave-Convex Laminate>

The fine concave-convex laminate according to this embodiment may be used, for example, as a structural member in a camera module-mounted device. The fine concave-convex laminate according to this embodiment is suitable for use in camera module-mounted devices that are required to be thinner, such as a camera module-mounted laptop PC, tablet PC, smartphone, and mobile phone.

Figure 13:
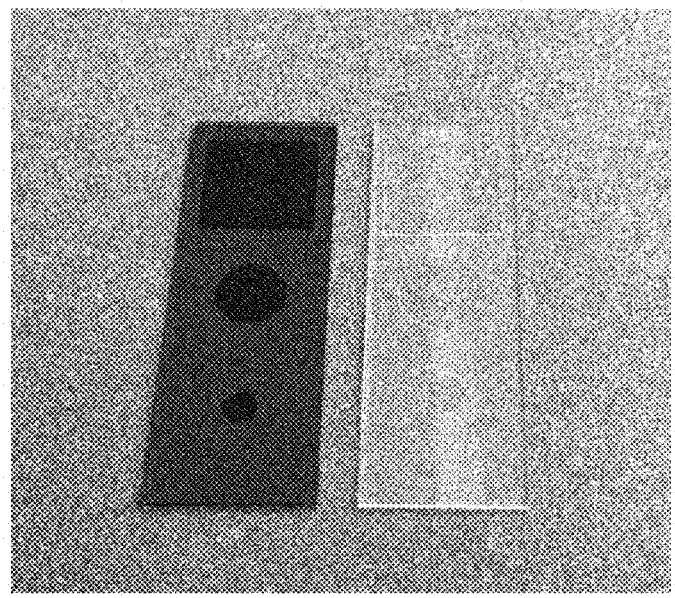
FIG. 13 is an image diagram of a fine concave-convex laminate according to one of the disclosed embodiments.
Figure 14A:
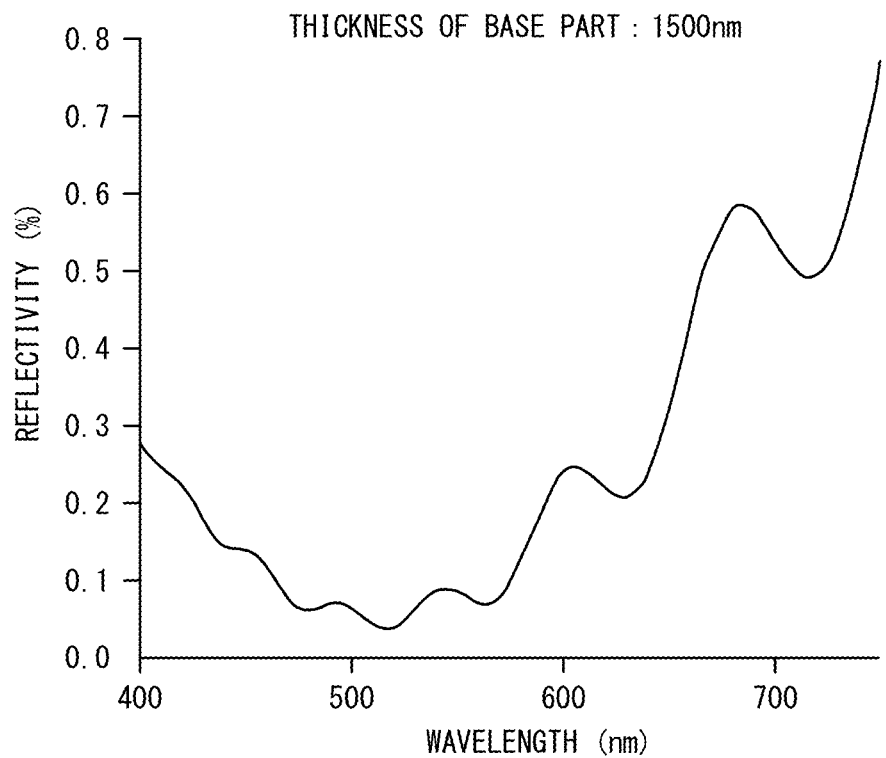
FIG. 14A is a schematic diagram illustrating a light reflection spectrum of a fine concave-convex laminate according to one of the disclosed embodiments.
Figure 14B:
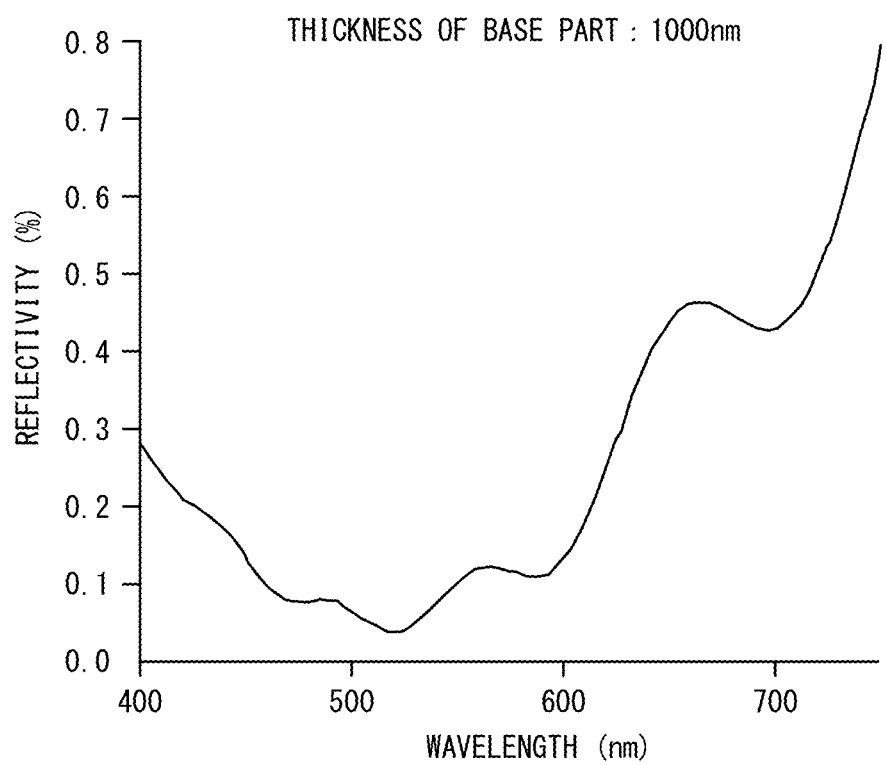
FIG. 14B is a schematic diagram illustrating a light reflection spectrum of a fine concave-convex laminate according to one of the disclosed embodiments.
Figure 14C:
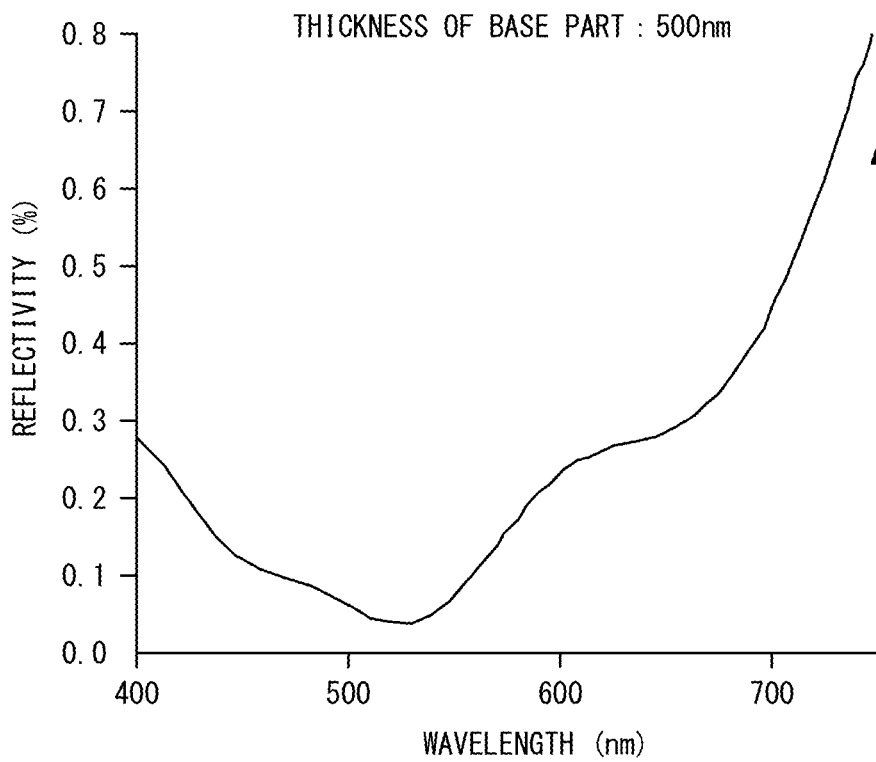
FIG. 14C is a schematic diagram illustrating a light reflection spectrum of a fine concave-convex laminate according to one of the disclosed embodiments.
Figure 14D:
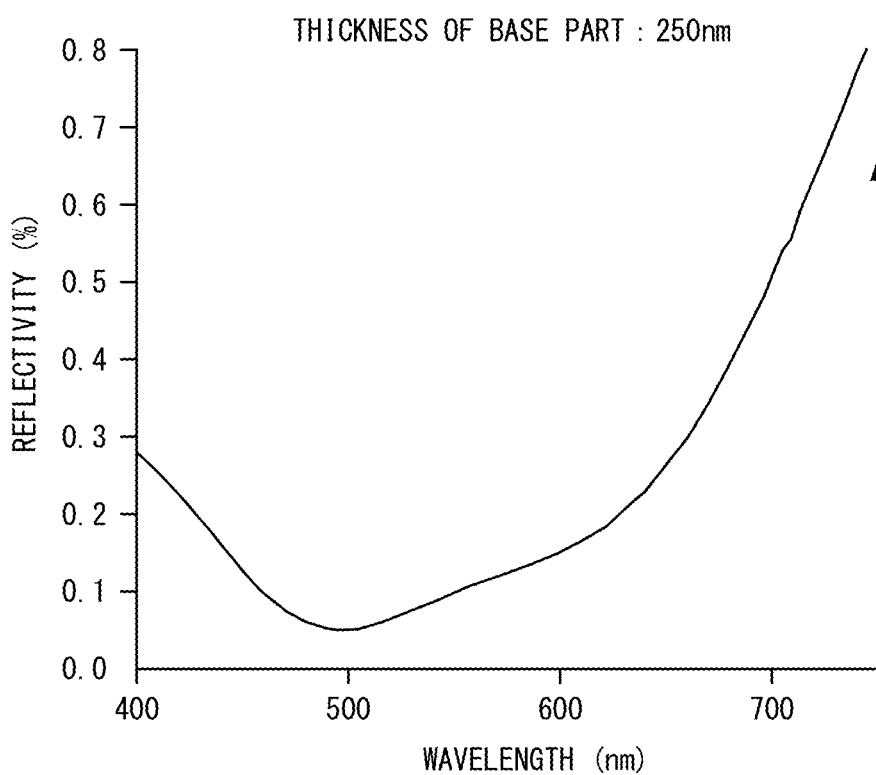
FIG. 14D is a schematic diagram illustrating a light reflection spectrum of a fine concave-convex laminate according to one of the disclosed embodiments.

In the fine concave-convex laminate 100 according to this embodiment, the first transparent organic layer 110 and the second transparent organic layer 120 may be laminated only on part of the surface of the substrate 101, as illustrated in FIG. 1. Such a fine concave-convex laminate is, for example, suitable for use as a display panel in a camera module-mounted device (e.g. a laptop PC, a tablet PC, a smartphone, a mobile phone) having an image sensor provided on the display surface side where images are displayed, which is widely distributed in recent years. Specifically, the camera module-mounted device can be obtained by arranging the foregoing fine concave-convex laminate as the display panel and the image sensor of the camera module so that the composite layer 130 is located directly above the image sensor. In such a camera module-mounted device, the antireflection treatment is minimized, high antireflection effect due to the composite layer 130 is achieved, and reduced thickness is achieved. FIG. 13 is an image diagram of the fine concave-convex laminate 100 in which the first transparent organic layer 110 and the second transparent organic layer 120 are laminated only on part of the surface of the substrate 101, for reference. In the drawing, the first transparent organic layer 110 and the second transparent organic layer 120 are laminated on part of the surface of the substrate 101 in a rectangular shape in a plan view and in a circular shape in a plan view.

A camera module-mounted device to which the fine concave-convex laminate according to this embodiment is applied will be described in detail later.

(Production Method for Fine Concave-Convex Laminate)

A production method for a fine concave-convex laminate according to the present disclosure comprises a sandwiching and pressure joining step, a curing A step, a first peeling step, a lamination and pressing step, a curing B step, and a second peeling step. With this method, a composite layer having a fine concave-convex structure at its surface can be formed on a substrate without fracture to produce a fine concave-convex laminate that has excellent antireflection performance and can suppress scattering and absorption of short-wavelength light.

A production method for a fine concave-convex laminate according to one of the disclosed embodiments (hereafter also referred to as a "production method according to this embodiment") will be described below, with reference to FIGS. 4A to 4H.

<Sandwiching and Pressure Joining Step>

Figure 4A:
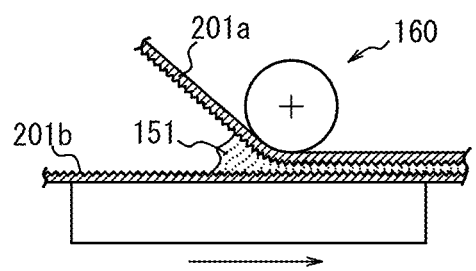
FIG. 4A is a schematic diagram illustrating a step in a production method for a fine concave-convex laminate according to one of the disclosed embodiments.

The sandwiching and pressure joining step is a step of sandwiching a UV curable resin A between two holding films each having a fine concave-convex structure at its surface and pressure joining them. In the production method according to this embodiment, first, two holding films each having a fine concave-convex structure at its surface (a first holding film 201a and a second holding film 201b) are prepared. Next, a UV curable resin A (151) is sandwiched between the first holding film 201a and the second holding film 201b in a state in which their fine concave-convex structures face each other, as illustrated in FIG. 4A. The UV curable resin A (151) is not limited, and examples include a UV curable acrylic resin and a UV curable epoxy resin. Additives such as a curing initiator may be added to the UV curable resin A (151) according to need.

The viscosity of the UV curable resin A151 is preferably 30 cps or less. If the viscosity of the UV curable resin A151 is 30 cps or less, the thickness of the part without any fine concave-convex structure can be limited to 250 nm or less more easily in the formation of the second transparent organic layer.

Each of the holding films 201a and 201b having the fine concave-convex structure at its surface can be produced, for example, by forming a fine concave-convex layer having a predetermined concave-convex pattern on a base substrate.

The material of the base substrate is not limited, but is preferably transparent and hard to break. Examples include PET (polyethylene terephthalate) and TAC (triacetyl cellulose).

The fine concave-convex layer can be formed on the base substrate, for example, by a method including: a step of applying an uncured UV curable resin onto one surface of the base substrate; a step of bringing a roll on which the corresponding concave-convex pattern is formed into close contact with the applied UV curable resin to transfer the concave-convex pattern to the UV curable resin; a step of irradiating the applied UV curable resin with UV light to cure the UV curable resin; and a step of peeling the cured UV curable resin from the roll. The UV curable resin is not limited, and examples include a UV curable acrylic resin and a UV curable epoxy resin. Additives such as a curing initiator may be added to the UV curable resin according to need.

The surface of the fine concave-convex structure of each of the first holding film 201*a* and the second holding film 201*b* may be coated with a film made of an inorganic material, to enhance peelability.

The sandwich body is then pressure joined in the sandwiching direction by a pressure joining device such as a roll laminator 160, as illustrated in FIG. 4A. In the sandwiching and pressure joining step, the thickness of the resultant second transparent organic layer 120 can be adjusted by adjusting the pressure in the pressure joining.

<Curing A Step>

Figure 4B:
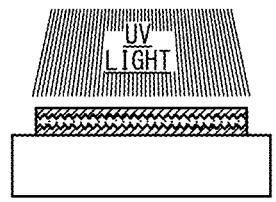
FIG. 4B is a schematic diagram illustrating a step in the production method for a fine concave-convex laminate according to one of the disclosed embodiments.
Figure 4C:
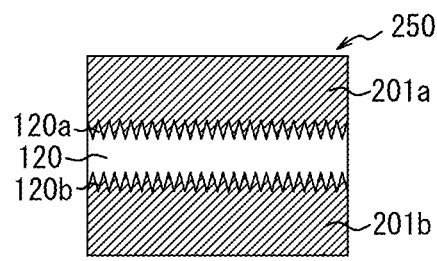
FIG. 4C is a schematic diagram illustrating a step in the production method for a fine concave-convex laminate according to one of the disclosed embodiments.
Figure 4D:
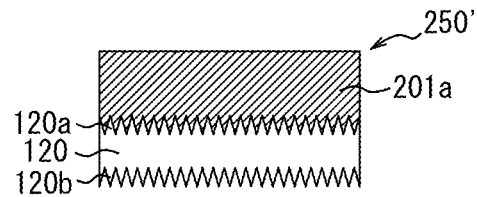
FIG. 4D is a schematic diagram illustrating a step in the production method for a fine concave-convex laminate according to one of the disclosed embodiments.

The curing A step is a step of curing the sandwiched UV curable resin A by irradiation with UV light to form the second transparent organic layer having fine concave-convex structures at both surfaces. In the production method according to this embodiment, the sandwiched UV curable resin A (151) is irradiated with UV light to cure the UV curable resin A (151), as illustrated in FIG. 4B. As a result of the UV curable resin A (151) being cured, a holding film laminate 250 including the second transparent organic layer 120 having fine concave-convex structures at both surfaces is obtained, as illustrated in FIG. 4C. The curing A step may be performed simultaneously with the sandwiching and pressure joining step. The fine concave-convex structures at both surfaces of the second transparent organic layer 120 obtained in this way can mesh with the fine concave-convex structures of the first holding film 201*a* and the second holding film 201*b* without a gap.

<First Peeling Step>

The first peeling step is a step of peeling one holding film from the second transparent organic layer. In the production method according to this embodiment, the second holding film 201*b* is peeled from the holding film laminate 250 illustrated in FIG. 4C, to obtain the state illustrated in FIG. 4D (one-side peeled laminate 250').

<Lamination and Pressing Step>

Figure 4E:
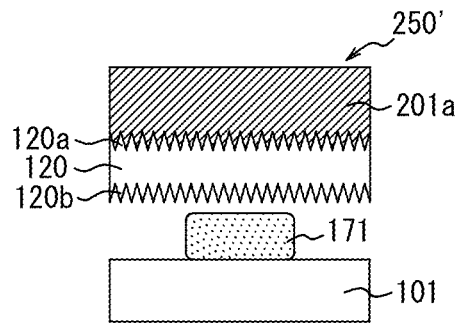
FIG. 4E is a schematic diagram illustrating a step in the production method for a fine concave-convex laminate according to one of the disclosed embodiments.
Figure 4F:
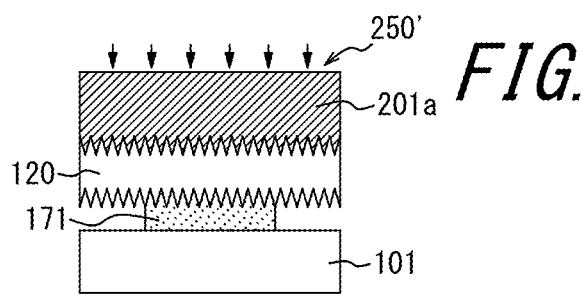
FIG. 4F is a schematic diagram illustrating a step in the production method for a fine concave-convex laminate according to one of the disclosed embodiments.

The lamination and pressing step is a step of laminating the second transparent organic layer from which one holding film has been peeled on a substrate in a state in which the surface from which the holding film has been peeled is in contact with the substrate with a UV curable resin B therebetween, and pressing the second transparent organic layer from the other holding film side. In the production method according to this embodiment, first, a UV curable resin B (171) is applied onto a substrate 101 (potting), as illustrated in FIG. 4E. Next, the one-side peeled laminate 250' is placed in a state in which the surface from which the second holding film 201*b* has been peeled faces the substrate 101, and pressed against the UV curable resin B (171) applied onto the substrate 101, as illustrated in FIG. 4F. The pressed UV curable resin B (171) is spread between the substrate 101 and the second transparent organic layer 120. The UV curable resin B (171) is not limited, and examples include a UV curable acrylic resin and a UV curable epoxy resin. Additives such as a curing initiator may be added to the UV curable resin B (171) according to need.

The substrate 101 is as described above.

<Curing B Step>

Figure 4G:
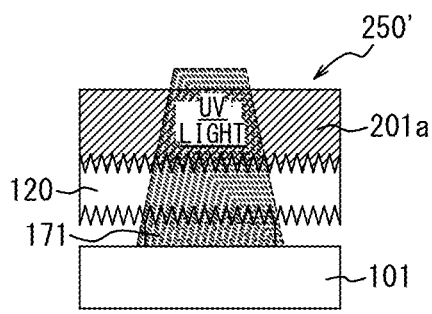
FIG. 4G is a schematic diagram illustrating a step in the production method for a fine concave-convex laminate according to one of the disclosed embodiments.

The curing B step is a step of curing the UV curable resin B by irradiation with UV light while pressing the second transparent organic layer, to form the first transparent organic layer having a fine concave-convex structure at the second transparent organic layer-side surface. In the production method according to this embodiment, the UV curable resin B (171) is irradiated with UV light while maintaining the press to cure the UV curable resin B (171), as illustrated in FIG. 4G. As a result of being cured, the UV curable resin B (171) adheres to the substrate 101 and the second transparent organic layer 120, thus forming the first transparent organic layer 110.

The curing B step may be performed simultaneously with the pressing in the lamination and pressing step.

<Second Peeling Step>

Figure 4H:
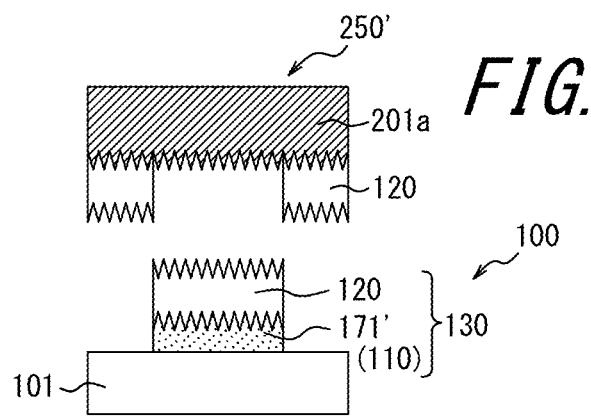
FIG. 4H is a schematic diagram illustrating a step in the production method for a fine concave-convex laminate according to one of the disclosed embodiments.

The second peeling step is a step of releasing the press of the second transparent organic layer and peeling the part of the second transparent organic layer fixed to the substrate by the first transparent organic layer from the other holding film while separating the part fixed by the first transparent organic layer from the part of the second transparent organic layer other than the part fixed by the first transparent organic layer. In the production method according to this embodiment, the press of the one-side peeled laminate 250' is released to release the one-side peeled laminate 250' from the substrate 101, thus peeling the second transparent organic layer 120 from the one-side peeled laminate 250', as illustrated in FIG. 4H. As a result of the curing B step, in the region of the second transparent organic layer 120 of the one-side peeled laminate 250' in which the UV curable resin B (171) is present and that is irradiated with UV light, the second transparent organic layer 120 and the substrate 101 are fixed to each other by the cured UV curable resin B (171'). By releasing the one-side peeled laminate 250', the part of the second transparent organic layer 120 fixed by the cured UV curable resin B (171') is peeled from the one-side peeled laminate 250' (first holding film 201*a*) while being separated (divided) from the part of the second transparent organic layer 120 on the first holding film 201*a* other than the part fixed by the cured UV curable resin B (171'). Consequently, the composite layer 130 composed of the cured UV curable resin B (171'), i.e. the first transparent organic layer 110, and the second transparent organic layer 120 is formed on the substrate 101.

As illustrated in FIG. 4H, in the composite layer 130 formed on the substrate 101, the first transparent organic layer 110 can enter into the concave portions on the substrate 101-side surface of the second transparent organic layer 120. In other words, the first transparent organic layer 110 can have a fine concave-convex structure at the second transparent organic layer 120-side surface. Such a composite layer 130 has excellent antireflection performance. For example, the composite layer 130 can have an average reflectivity of 1% or less in a wavelength range of 400 nm to 750 nm.

(Camera Module-Mounted Device)

A camera module-mounted device according to the present disclosure comprises a camera module and a display plate, wherein the display plate includes a first transparent organic layer laminated on at least part of a surface thereof, and a second transparent organic layer laminated on the first transparent organic layer. The first transparent organic layer has a fine concave-convex structure at a surface facing the second transparent organic layer, and the second transparent organic layer has fine concave-convex structures at both surfaces. A thickness of a composite layer composed of the first transparent organic layer and the second transparent organic layer is 15 µm or less. The camera module is set facing the second transparent organic layer. With this camera module-mounted device, a still image or a moving image can be captured by an image sensor of the camera module through the composite layer composed of the first transparent organic layer and the second transparent organic layer. Hence, light reflection is suppressed, and the captured image has no color unevenness, ghosts, and the like.

Specific examples of the camera module-mounted device include a laptop PC, a tablet PC, a smartphone, and a mobile phone.

A camera module-mounted device according to one of the disclosed embodiments (hereafter also referred to as a "device according to this embodiment") will be described below, with reference to FIG. 5.

Figure 5:
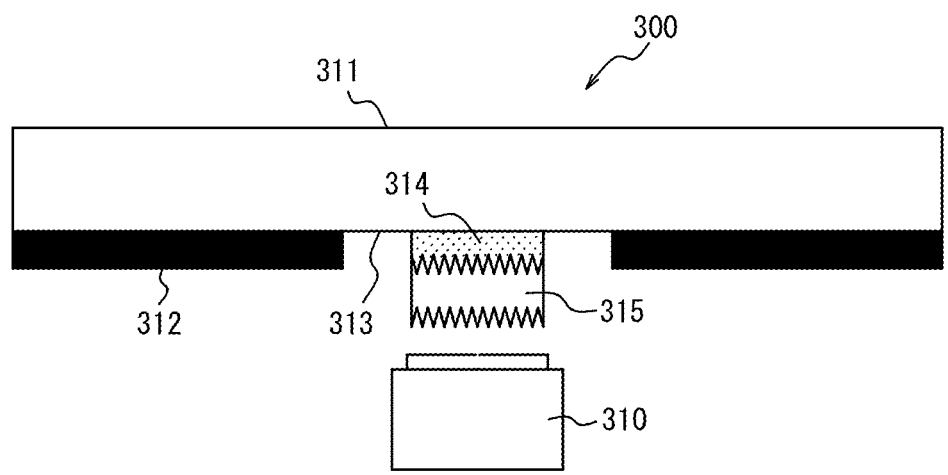
FIG. 5 is a schematic diagram illustrating the vicinity of a camera module in a camera module-mounted device according to one of the disclosed embodiments.

FIG. 5 is a schematic diagram illustrating the vicinity of a camera module in the camera module-mounted device according to this embodiment. As illustrated in FIG. 5, a camera module-mounted device 300 according to this embodiment includes a camera module 310 and a display plate 311. A shading region 312 and a transparent region (non-shading region) 313 are formed at one surface of the display plate 311. A first transparent organic layer 314 is laminated on the transparent region 313 of the display plate 311, and a second transparent organic layer 315 is laminated on the first transparent organic layer 314.

The display plate 311 is preferably transparent, as it is used as a liquid crystal display, a touch panel, or the like. For example, the display plate 311 is made of glass, glass coated with any organic material, or polymethyl methacrylate (PMMA). An example of the organic material is polyimide. The first transparent organic layer 314 and the second transparent organic layer 315 are as described above with regard to the first transparent organic layer and the second transparent organic layer included in the fine concave-convex laminate according to the present disclosure.

The display plate 311 including the first transparent organic layer 314 and the second transparent organic layer 315 can be produced by the foregoing production method for a fine concave-convex laminate according to the present disclosure.

The camera module 310 is set facing the second transparent organic layer 315, as illustrated in FIG. 5.

The detailed conditions of the device according to this embodiment, such as the specific structure of the camera module 310 and the distance between the camera module 310 and the second transparent organic layer 315, are not limited.

EXAMPLES

More detailed description will be given below by way of examples and comparative examples, although the present disclosure is not limited to these examples.

In examples and comparative examples, the difference absolute average value was examined by optical calculation using calculation software "TFCalc". In the optical calculation, a refractive index at a wavelength of 589 nm was used.

Example 1

A model of the fine concave-convex laminate 100 in which the substrate 101, the first transparent organic layer 110, and the second transparent organic layer 120 are laminated in this order, the first transparent organic layer 110 has the fine concave-convex structure 110a at the second transparent organic layer 120-side surface, and the second transparent organic layer 120 has the fine concave-convex structures 120a and 120b at both surfaces as illustrated in FIG. 1 was used. The refractive index $n_0$ of the substrate was 1.500, the refractive index $n_1$ of the first transparent organic layer was 1.490, and the refractive index $n_2$ of the second transparent organic layer was 1.520. The first transparent organic layer 110 and the second transparent organic layer 120 had the concave portions and convex portions of their fine concave-convex structures meshing with each other. The thickness of the base part 111 of the first transparent organic layer 110 was 6000 nm. The depth of the concave portions (the height of the convex portions) of the first transparent organic layer 110 and the second transparent organic layer 120 meshing with each other was 220 nm. The thickness of the base part 121 of the second transparent organic layer 120 was 1000 nm. The depth of the other concave portions (the height of the other convex portions) of the second transparent organic layer 120 was 220 nm. The thickness of the composite layer 130 composed of the first transparent organic layer 110 and the second transparent organic layer 120 was calculated at 7440 nm.

Figure 6:
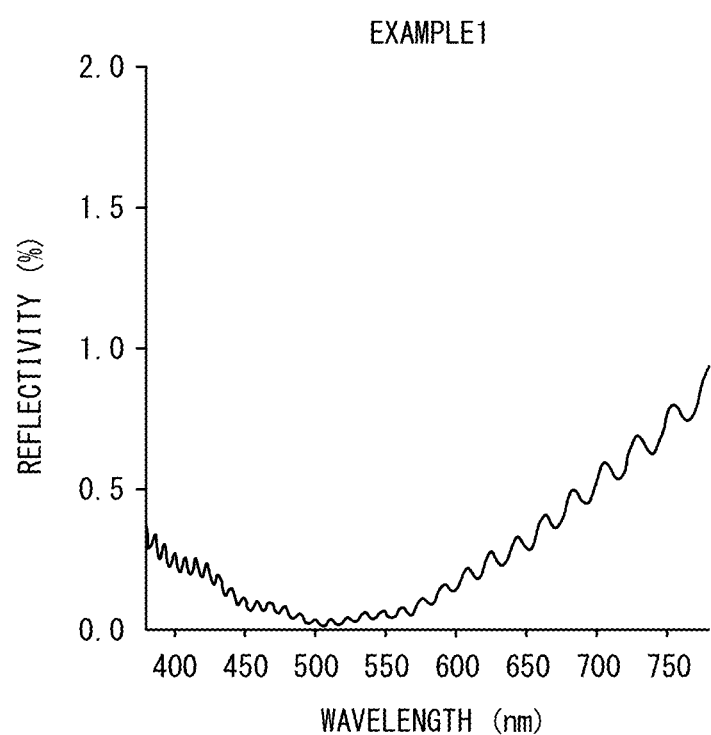
FIG. 6 is a schematic diagram illustrating a light reflection spectrum of a fine concave-convex laminate according to one of the disclosed embodiments.
Figure 7:
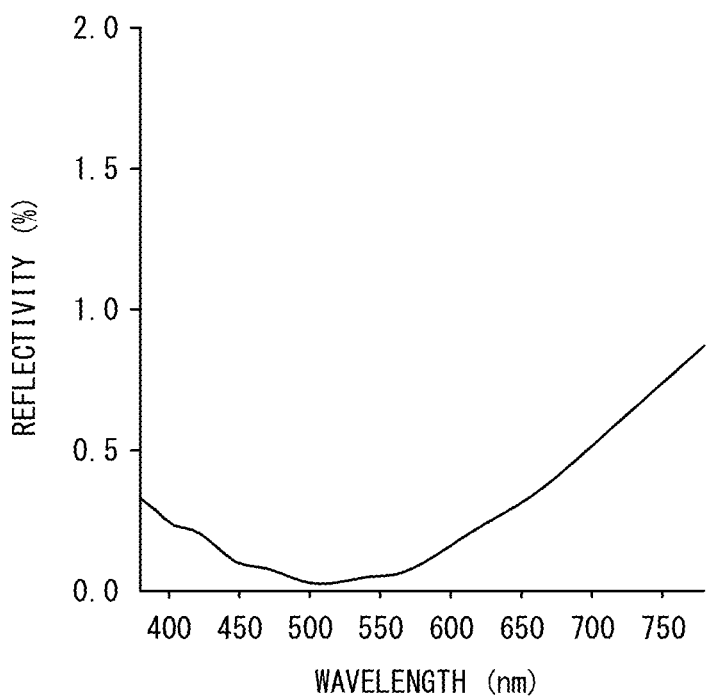
FIG. 7 is a schematic diagram illustrating a light reflection spectrum of a fine concave-convex laminate according to one of the disclosed embodiments.
Figure 8:
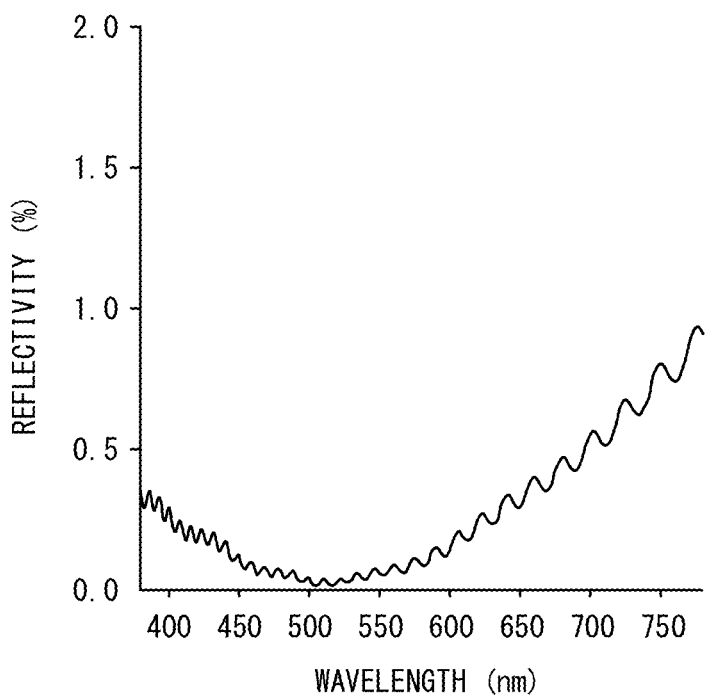
FIG. 8 is a schematic diagram illustrating a light reflection spectrum of a fine concave-convex laminate according to one of the disclosed embodiments.
Figure 9:
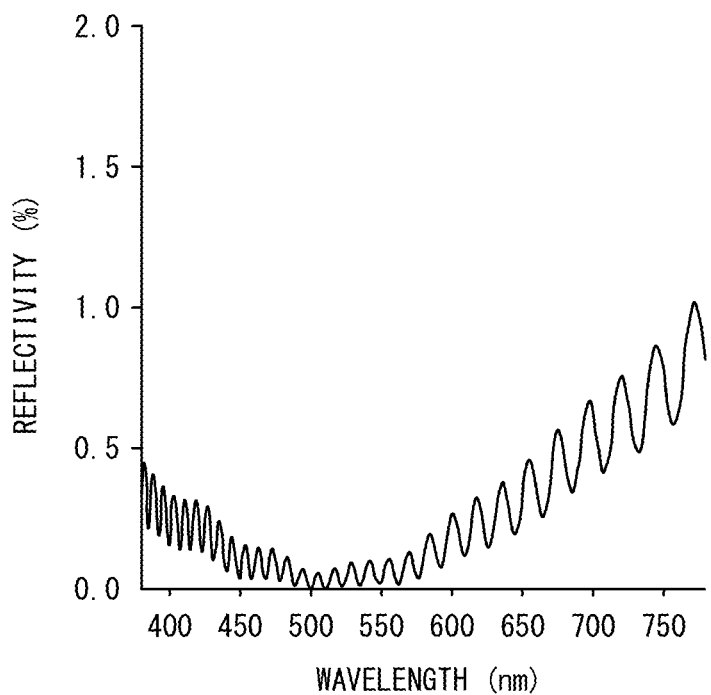
FIG. 9 is a schematic diagram illustrating a light reflection spectrum of a fine concave-convex laminate according to one of the disclosed embodiments.
Figure 10:
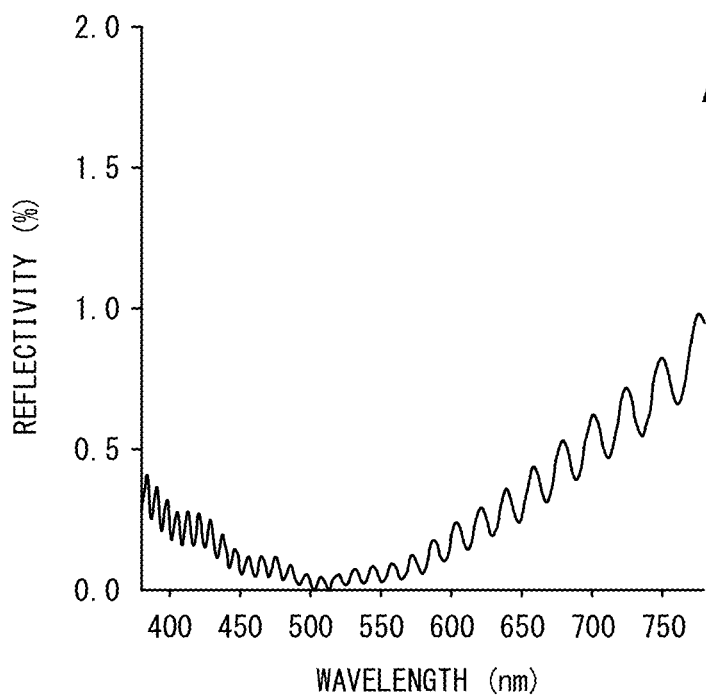
FIG. 10 is a schematic diagram illustrating a light reflection spectrum of a fine concave-convex laminate according to one of the disclosed embodiments.
Figure 11:
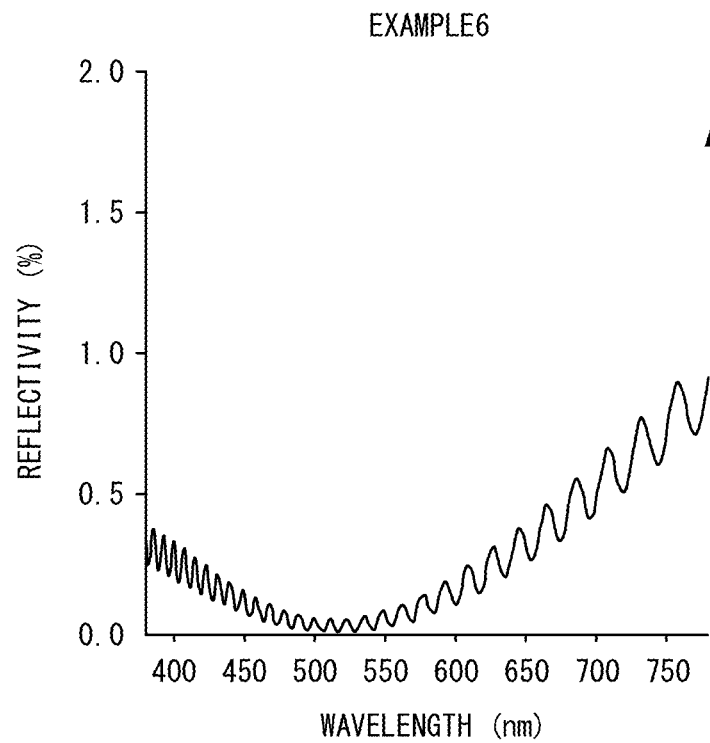
FIG. 11 is a schematic diagram illustrating a light reflection spectrum of a fine concave-convex laminate according to one of the disclosed embodiments.
Figure 12:
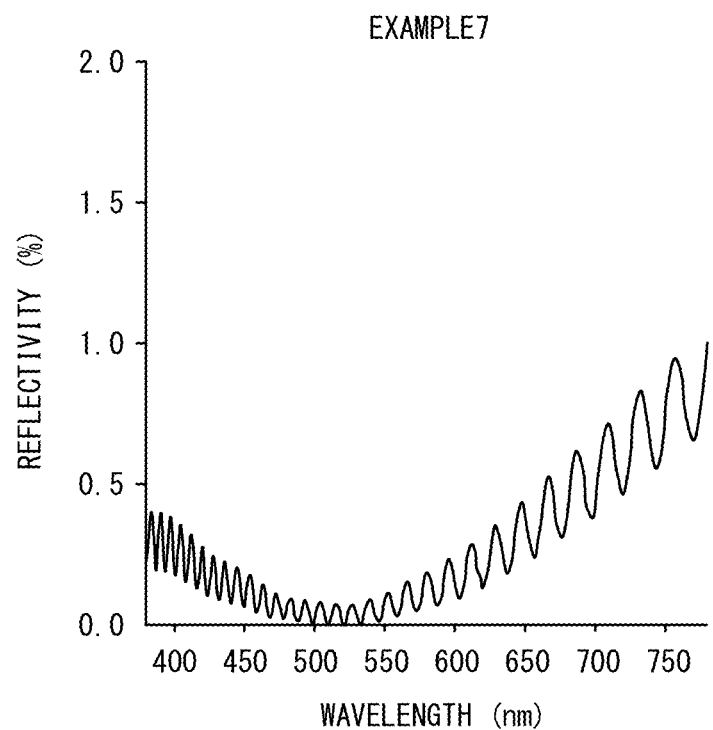
FIG. 12 is a schematic diagram illustrating a light reflection spectrum of a fine concave-convex laminate according to one of the disclosed embodiments.

FIG. 6 illustrates the reflection spectrum of light from the second transparent organic layer side in the fine concave-convex laminate model. The difference absolute average value was calculated from the obtained light reflection spectrum. The result is shown in Table 1. A smaller value indicates less oscillation (ripple) in the spectrum, and less color unevenness and reflection deterioration.

Moreover, the light loss rate (%) due to scattering and absorption when causing light of a wavelength of 425 nm to enter the fine concave-convex laminate model from the second transparent organic layer side at an incidence angle of 7° was calculated. Specifically, 100%−{transmittance (Tr)+reflectivity (Re)} was calculated. Using this value, the light loss rate was evaluated according to the following criteria. The result is shown in Table 1.

A: less than 1.00%
B: 1.00% or more and less than 1.40%
C: 1.40% or more.

Examples 2 to 7

The same fine concave-convex laminate model as in Example 1 was used, except that the refractive index of the first transparent organic layer was changed as shown in Table 1. Whether the fine concave-convex laminate model satisfied the foregoing Formulas (1) and (2), whether the fine concave-convex laminate model satisfied all of the foregoing Formulas (1) to (3), and whether the fine concave-convex laminate model satisfied all of the foregoing Formula (4) to Formula (6) are shown in Table 1 (the same applies to the following examples).

FIGS. 7 to 12 illustrate the reflection spectra of light from the second transparent organic layer side in the respective examples. Further, the difference absolute average value was calculated and the light loss rate was evaluated in the same way as in Example 1. The results are shown in Table 1.

Example 8

A model of the fine concave-convex laminate 100 illustrated in FIG. 1 was used, as in Example 1. $n_0$ was 1.518, $n_1$ was 1.500, and $n_2$ was 1.520. The first transparent organic layer 110 and the second transparent organic layer 120 had the concave portions and convex portions of their fine concave-convex structures meshing with each other. The thickness of the base part 111 of the first transparent organic layer 110 was 8200 nm. The depth of the concave portions (the height of the convex portions) of the first transparent organic layer 110 and the second transparent organic layer 120 meshing with each other was 220 nm. The thickness of the base part 121 of the second transparent organic layer 120 was 1000 nm. The depth of the other concave portions (the height of the other convex portions) of the second transparent organic layer 120 was 220 nm. The thickness of the composite layer 130 composed of the first transparent organic layer 110 and the second transparent organic layer 120 was calculated at 9640 nm.

The difference absolute average value was calculated and the light loss rate was evaluated in the same way as in Example 1. The results are shown in Table 1.

Example 9

A model of the fine concave-convex laminate 100 illustrated in FIG. 1 was used, as in Example 1. $n_0$ was 1.515, $n_1$ was 1.510, and $n_2$ was 1.530. The first transparent organic layer 110 and the second transparent organic layer 120 had the concave portions and convex portions of their fine concave-convex structures meshing with each other. The thickness of the base part 111 of the first transparent organic layer 110 was 2000 nm. The depth of the concave portions (the height of the convex portions) of the first transparent organic layer 110 and the second transparent organic layer 120 meshing with each other was 220 nm. The thickness of the base part 121 of the second transparent organic layer 120 was 1000 nm. The depth of the other concave portions (the height of the other convex portions) of the second transparent organic layer 120 was 220 nm. The thickness of the composite layer 130 composed of the first transparent organic layer 110 and the second transparent organic layer 120 was calculated at 3440 nm.

The difference absolute average value was calculated and the light loss rate was evaluated in the same way as in Example 1. The results are shown in Table 1.

Comparative Example 1

A model of a fine concave-convex laminate in which a substrate, a first transparent organic layer, and a second transparent organic layer are laminated in this order, both surfaces of the first transparent organic layer are flat surfaces, and the second transparent organic layer has a fine concave-convex structure only at the surface (upper surface) opposite to the first transparent organic layer was used. $n_0$ was 1.518, $n_1$ was 1.500, and $n_2$ was 1.520. The thickness of the composite layer composed of the first transparent organic layer and the second transparent organic layer was 9840 nm.

The difference absolute average value was calculated and the light loss rate was evaluated in the same way as in Example 1. The results are shown in Table 1.

Comparative Examples 2 and 3

The same fine concave-convex laminate model as in Comparative Example 1 was used, except that the thickness of the composite layer composed of the first transparent organic layer and the second transparent organic layer was changed as shown in Table 1.

The difference absolute average value was calculated and the light loss rate was evaluated in the same way as in Example 1. The results are shown in Table 1.

Comparative Example 4

A model of a flat laminate in which a substrate, a first transparent organic layer, and a second transparent organic layer are laminated in this order, both surfaces of the first transparent organic layer are flat surfaces, and both surfaces of the second transparent organic layer are flat surfaces was used. $n_0$ was 1.520, $n_1$ was 1.500, and $n_2$ was 1.520. The thickness of the composite layer composed of the first transparent organic layer and the second transparent organic layer was 25000 nm.

The difference absolute average value was calculated and the light loss rate was evaluated in the same way as in Example 1. The results are shown in Table 1.

TABLE 1

| | | Example 1 | Example 2 | Example 3 | Example 4 | Example 5 | Example 6 | Example 7 |
|---|---|---|---|---|---|---|---|---|
| Second transparent organic layer | Refractive index ($n_2$) | 1.520 | 1.520 | 1.520 | 1.520 | 1.520 | 1.520 | 1.520 |
| | Presence of fine concave-convex structure | Present (Both surfaces) | Present (Both surfaces) | Present (Both surfaces) | Present (Both surfaces) | Present (Both surfaces) | Present (Both surfaces) | Present (Both surfaces) |
| First transparent organic layer | Refractive index ($n_1$) | 1.490 | 1.500 | 1.510 | 1.470 | 1.480 | 1.520 | 1.530 |
| | Presence of fine concave-convex structure | Present (Only upper surface) | Present (Only upper surface) | Present (Only upper surface) | Present (Only upper surface) | Present (Only upper surface) | Present (Only upper surface) | Present (Only upper surface) |
| Substrate | Refractive index ($n_0$) | 1.500 | 1.500 | 1.500 | 1.500 | 1.500 | 1.500 | 1.500 |
| Thickness of composite layer [nm] | | 7440 | 7440 | 7440 | 7440 | 7440 | 7440 | 7440 |
| Conformity to Formulas (1) and (2) | | Conforming | Conforming | Conforming | | Conforming | Conforming | Conforming |
| Conformity to Formulas (1), (2), | | Conforming | Conforming | Conforming | | | | |

TABLE 1-continued

| | Example 8 | Example 9 | Comparative Example 1 | Comparative Example 2 | Comparative Example 3 | Comparative Example 4 |
|---|---|---|---|---|---|---|
| and (3) | | | | | | |
| Conformity to Formulas (4), (5), and (6) | | | | | | |
| Difference absolute average value [%] | 0.019 | 0.003 | 0.019 | 0.058 | 0.039 | 0.038 | 0.056 |
| Evaluation of loss rate of light of wavelength of 425 nm | A (<1%) | A (<1%) | A (<1%) | A (<1%) | A (<1%) | A (<1%) | A (<1%) |

| | | Example 8 | Example 9 | Comparative Example 1 | Comparative Example 2 | Comparative Example 3 | Comparative Example 4 |
|---|---|---|---|---|---|---|---|
| Second transparent organic layer | Refractive index ($n_2$) | 1.520 | 1.530 | 1.520 | 1.520 | 1.520 | 1.520 |
| | Presence of fine concave-convex structure | Present (Both surfaces) | Present (Both surfaces) | Present (Only upper surface) | Present (Only upper surface) | Present (Only upper surface) | Not present |
| First transparent organic layer | Refractive index($n_1$) | 1.500 | 1.510 | 1.500 | 1.500 | 1.500 | 1.500 |
| | Presence of fine concave-convex structure | Present (Only upper surface) | Present (Only upper surface) | Not present | Not present | Not present | Not present |
| Substrate | Refractive index($n_0$) | 1.518 | 1.515 | 1.518 | 1.518 | 1.518 | 1.520 |
| Thickness of composite layer [nm] | | 9640 | 3440 | 9840 | 122020 | 25020 | 25000 |
| Conformity to Formulas (1) and (2) | | | Conforming | | | | |
| Conformity to Formulas (1), (2), and (3) | | | Conforming | | | | |
| Conformity to Formulas (4), (5), and (6) | | Conforming | | Conforming | Conforming | Conforming | Conforming |
| Difference absolute average value [%] | | 0.038 | 0.001284 | 0.0200 | 0.0190 | 0.0200 | 0.172 |
| Evaluation of loss rate of light of wavelength of 425 nm | | A (0.94%) | A (0.36%) | B (1.03%) | B (1.14%) | C (1.42%) | B (1.14%) |

As can be understood from Table 1, in the fine concave-convex laminates according to Examples 1 to 9, the thickness of the composite layer composed of the first transparent organic layer and the second transparent organic layer was well below 15 μm, thus achieving thickness reduction. In addition, in the fine concave-convex laminates according to Examples 1 to 9, the first transparent organic layer had a fine concave-convex structure at the second transparent organic layer-side surface and the second transparent organic layer had fine concave-convex structures at both surfaces, so that excellent antireflection performance was exhibited and scattering and absorption of short-wavelength light was sufficiently suppressed.

In particular, in the fine concave-convex laminates according to Examples 1 to 3, 5 to 7, and 9 satisfying both of Formulas (1) and (2) and Example 8 satisfying all of Formulas (4), (5), and (6), the difference absolute average value was small. Especially the fine concave-convex laminates according to Examples 1 to 3 and 9 satisfying all of Formulas (1), (2), and (3) had a difference absolute average value of 0.020% or less, contributing to less oscillation (ripple) in the reflection spectrum and less color unevenness and reflection deterioration.

Next, the influence of the thickness of the part of the second transparent organic layer without any fine concave-convex structure in the fine concave-convex laminate on the reflection spectrum was examined.

A model of the fine concave-convex laminate 100 in which the substrate 101, the first transparent organic layer 110, and the second transparent organic layer 120 are laminated in this order, the first transparent organic layer 110 has the fine concave-convex structure 110a at the second transparent organic layer 120-side surface, and the second transparent organic layer 120 has the fine concave-convex structures 120a and 120b at both surfaces as illustrated in FIG. 1 was used. The refractive index $n_0$ of the substrate was 1.500, the refractive index $n_1$ of the first transparent organic layer was 1.470, and the refractive index $n_2$ of the second transparent organic layer was 1.520. The first transparent organic layer 110 and the second transparent organic layer 120 had the concave portions and convex portions of their fine concave-convex structures meshing with each other. The thickness of the base part 111 of the first transparent organic layer 110 was 6000 nm. The depth of the concave portions (the height of the convex portions) of the first transparent organic layer 110 and the second transparent organic layer 120 meshing with each other was 220 nm. The depth of the other concave portions (the height of the other convex portions) of the second transparent organic layer 120 was 220 nm. The thickness of the base part 121 (the part without any fine concave-convex structure) of the second transparent organic layer 120 was set to 1500 nm, 1000 nm, 500 nm, 250 nm, and 50 nm, and the reflection spectrum of light from the second transparent organic layer side was obtained. FIGS. 14A to 14E illustrate the respective results. The difference absolute average value was calculated from each obtained light reflection spectrum. The results are shown in Table 2.

TABLE 2

| | | | | | |
|---|---|---|---|---|---|
| Thickness of part of second transparent organic layer without any fine concave-convex structure [nm] | 1500 | 1000 | 500 | 250 | 50 |
| Difference absolute average value [%] | 0.38 | 0.03 | 0.02 | 0.014 | 0.011 |

As can be understood from FIGS. 14A to 14E and Table 2, when the part of the second transparent organic layer without any fine concave-convex structure was thinner (e.g. 250 nm or less), the difference absolute average value was smaller, contributing to less oscillation (ripple) in the reflection spectrum and less color unevenness and reflection deterioration.

INDUSTRIAL APPLICABILITY

It is thus possible to provide a fine concave-convex laminate that is reduced in thickness, has excellent antireflection performance, and can suppress scattering and absorption of short-wavelength light, and a production method therefor. It is also possible to provide a camera module-mounted device capable of obtaining a captured image without color unevenness, ghosts, and the like.

REFERENCE SIGNS LIST

100 fine concave-convex laminate
101 substrate
110 first transparent organic layer
110a fine concave-convex structure
111 base part
120 second transparent organic layer
120a, 120b fine concave-convex structure
121 base part
130 composite layer
151 UV curable resin A
160 roll laminator
171 UV curable resin B
171' cured UV curable resin B
201a first holding film
201b second holding film
250 holding film laminate
250' one-side peeled laminate
300 camera module-mounted device
310 camera module
311 display plate
312 shading region
313 transparent region
314 first transparent organic layer
315 second transparent organic layer

The invention claimed is:

1. A fine concave-convex laminate comprising a substrate, a first transparent organic layer, and a second transparent organic layer laminated in the stated order,
   wherein the first transparent organic layer has a fine concave-convex structure at a surface facing the second transparent organic layer,
   the second transparent organic layer has a first fine concave-convex structure at a surface facing the first transparent organic layer, a second fine concave-convex structure at an opposite surface, and a base part between the first fine concave-convex structure and the second fine concave-convex structure,
   a thickness of a composite layer composed of the first transparent organic layer and the second transparent organic layer is 15 μm or less,
   a distance between a vertex of a deepest concave portion in the first fine concave-convex structure and a vertex of a deepest concave portion in the second fine concave-convex structure in a lamination direction is 0.01 nm or more and 100 nm or less, and
   the following Formulas (1), (2) and (3) are satisfied:

$$n_0 < n_2 \quad (1)$$

$$2n_0 - n_2 \leq n_1 \leq 2n_2 - n_0 \quad (2)$$

$$2n_0 - n_2 < n_1 < n_2 \quad (3)$$

where $n_0$ is a refractive index of the substrate in a visible light wavelength range, $n_1$ is a refractive index of the first transparent organic layer in the visible light wavelength range, and $n_2$ is a refractive index of the second transparent organic layer in the visible light wavelength range.

2. The fine concave-convex laminate according to claim 1, wherein the fine concave-convex structures at both surfaces of the second transparent organic layer each have a concave-convex pattern having a pitch of less than or equal to visible light wavelength.

3. The fine concave-convex laminate according to claim 1, wherein the first transparent organic layer and the second transparent organic layer are laminated only on part of a surface of the substrate.

4. The fine concave-convex laminate according to claim 1, wherein an average value of difference absolute values is 0.020% or less, the average value of difference absolute values being obtained by calculating, in a reflection spectrum of light from a side on which the second transparent organic layer is located, a wavelength moving average value per 1 nm using values of reflectivity of preceding and succeeding 25 nm in a wavelength range of 400 nm to 750 nm, calculating a difference absolute value between the wavelength moving average value and a value of the reflection spectrum, and averaging calculated difference absolute values.

5. The fine concave-convex laminate according to claim 1, wherein a refractive index $n_1$ of the first transparent organic layer at a wavelength of 550 nm is 1.480 or more and 1.580 or less.

6. The fine concave-convex laminate according to claim 1, used in a camera module-mounted device.

7. A production method for the fine concave-convex laminate according to claim 1, the production method comprising:
   sandwiching a UV curable resin A between two holding films each having a fine concave-convex structure at a surface thereof, and pressure joining the UV curable resin A and the two holding films;
   curing the sandwiched UV curable resin A by irradiation with UV light, to form the second transparent organic layer having the fine concave-convex structures at both surfaces;

peeling one holding film from the second transparent organic layer;

laminating the second transparent organic layer from which the one holding film has been peeled on a substrate in a state in which a surface from which the one holding film has been peeled is in contact with the substrate with a UV curable resin B therebetween, and pressing the second transparent organic layer from a side on which the other holding film is located;

curing the UV curable resin B by irradiation with UV light while pressing the second transparent organic layer, to form the first transparent organic layer having the fine concave-convex structure at the surface facing the second transparent organic layer; and releasing press of the second transparent organic layer and peeling a part of the second transparent organic layer fixed to the substrate by the first transparent organic layer from the other holding film while separating the part fixed by the first transparent organic layer from a part of the second transparent organic layer other than the part fixed by the first transparent organic layer.

8. A camera module-mounted device comprising a camera module and a display plate, wherein the display plate includes a first transparent organic layer laminated on at least part of a surface thereof, and a second transparent organic layer laminated on the first transparent organic layer, the first transparent organic layer has a fine concave-convex structure at a surface facing the second transparent organic layer, the second transparent organic layer has a first fine concave-convex structure at a surface facing the first transparent organic layer, a second fine concave-convex structure at an opposite surface, and a base part between the first fine concave-convex structure and the second fine concave-convex structure, a thickness of a composite layer composed of the first transparent organic layer and the second transparent organic layer is 15 μm or less, a distance between a vertex of a deepest concave portion in the first fine concave-convex structure and a vertex of a deepest concave portion in the second fine concave-convex structure in a lamination direction is 0.01 nm or more and 100 nm or less, the following Formulas (1), (2) and (3) are satisfied:

$$n_0 < n_2 \quad (1)$$

$$2n_0 - n_2 \leq n_1 \leq 2n_2 - n_0 \quad (2)$$

$$2n_0 - n_2 < n_1 < n_2 \quad (3)$$

where $n_0$ is a refractive index of the display plate in a visible light wavelength range, $n_1$ is a refractive index of the first transparent organic layer in the visible light wavelength range, and $n_2$ is a refractive index of the second transparent organic layer in the visible light wavelength range, and the camera module is set facing the second transparent organic layer.

9. A fine concave-convex laminate comprising a substrate, a first transparent organic layer, and a second transparent organic layer laminated in the stated order, wherein the first transparent organic layer has a fine concave-convex structure at a surface facing the second transparent organic layer, the second transparent organic layer has a first fine concave-convex structure at a surface facing the first transparent organic layer, a second fine concave-convex structure at an opposite surface and a base part between the first fine concave-convex structure and the second fine concave-convex structure, a thickness of a composite layer composed of the first transparent organic layer and the second transparent organic layer is 15 μm or less, a distance between a vertex of a deepest concave portion in the first fine concave-convex structure and a vertex of a deepest concave portion in the second fine concave-convex structure in a lamination direction is 0.01 nm or more and 100 nm or less, the following Formulas (1), (2) and (3) are satisfied:

$$n_0 < n_2 \quad (1)$$

$$2n_0 - n_2 \leq n_1 \leq 2n_2 - n_0 \quad (2)$$

$$2n_0 - n_2 < n_1 < n_2 \quad (3)$$

where $n_0$ is a refractive index of the substrate in a visible light wavelength range, $n_1$ is a refractive index of the first transparent organic layer in the visible light wavelength range, and $n_2$ is a refractive index of the second transparent organic layer in the visible light wavelength range, and a depth of each of concave portions in the second fine concave-convex structure is 150 nm or more and 300 nm or less.

* * * * *